Nov. 3, 1964   E. H. JENSEN   3,155,877
SAFETY CIRCUITS FOR ELECTRIC MOTORS
Filed Nov. 1, 1960
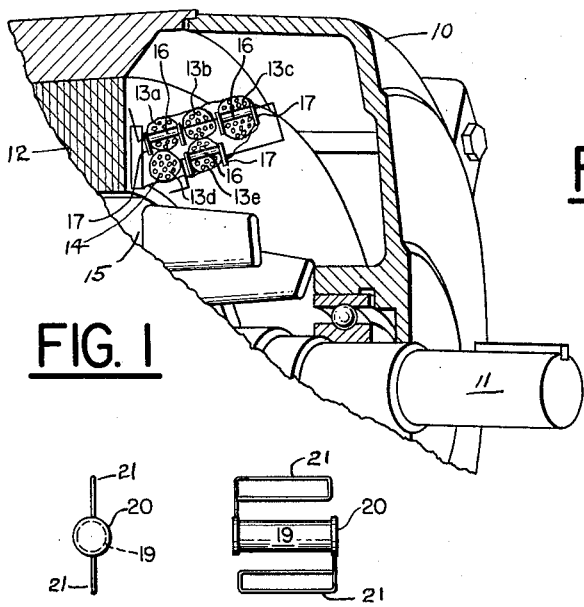
FIG. 1
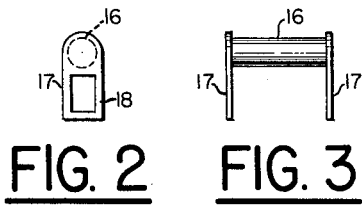
FIG. 2   FIG. 3
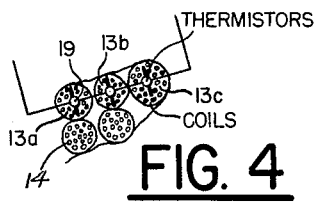
FIG. 4
FIG. 5   FIG. 6
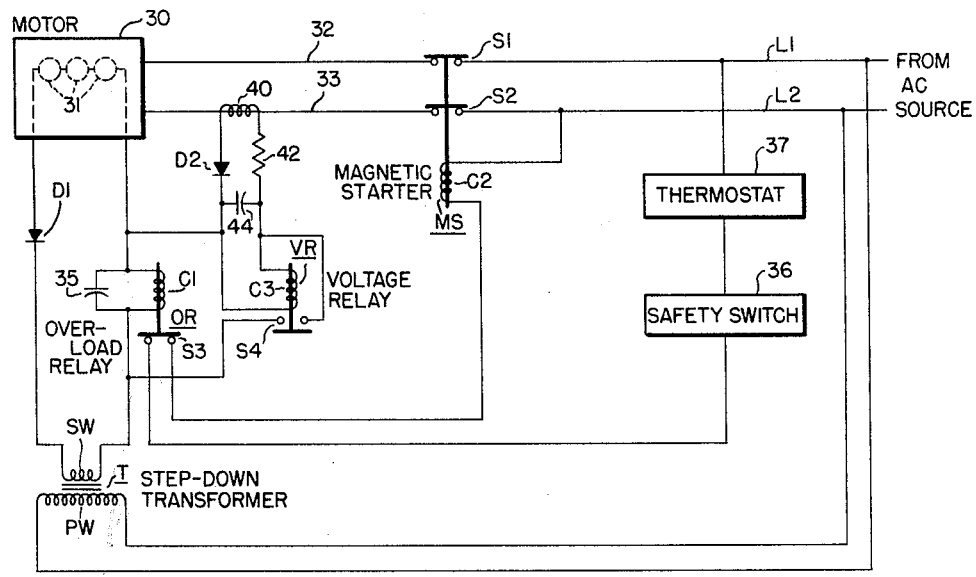
FIG. 7
ERIK H. JENSEN
INVENTOR
BY Robert T. Palmer
ATTORNEY United States Patent Office 3,155,877
Patented Nov. 3, 1964

3,155,877
SAFETY CIRCUITS FOR ELECTRIC MOTORS
Erik H. Jensen, Staunton, Va., assignor to Westinghouse Electric Corporation, East Pittsburgh, Pa., a corporation of Pennsylvania
Filed Nov. 1, 1960, Ser. No. 66,537
5 Claims. (Cl. 317—13)

This invention relates to overload controls for electric motors, in which thermistors are used to respond to overheating of the motor windings.

As disclosed in the pending application, Serial No. 856,189, filed Nov. 30, 1959, of K. W. Kyle, now Patent No. 3,065,381 thermistors in contact with the windings of motors of hermetically-sealed, refrigerant compressors are used instead of the usual overcurrent responsive means to deenergize the motors for the reason that such motors due to their being cooled by refrigerant gas, may be overheated when motor currents are minimum. Thermistors so used have, however, the fault that since they respond only to motor temperature, they respond too slowly when the rotors of the motors are locked.

An object of this invention is to increase the speed of response of overload controls for electric motors in which thermistors are used to sense the heat of the motor windings.

Another object of this invention is to use motor current to increase the speed of response of overload controls for electric motors in which thermistors are used to sense the heat of the motor windings.

This invention will now be described with reference to the annexed drawings, of which:

FIG. 1 is a fragmentary sectional view of an electric motor having thermistors embodying this invention, embedded in the motor windings;

FIG. 2 is an enlarged end view of one of the thermistors of FIG. 1;

FIG. 3 is a side view of the thermistor of FIG. 2;

FIG. 4 is a fragmentary view of the motor windings having other thermistors embodying this invention, embedded therein;

FIG. 5 is an end view of one of the thermistors of FIG. 4;

FIG. 6 is a side view of the thermistor of FIG. 5, and

FIG. 7 is a schematic of a safety circuit embodying this invention, and using the thermistors of FIG. 1 or 4.

During locked rotor periods, there are large increases in motor currents to which the ordinary thermistors in the ordinary thermistor circuits do not directly respond, especially when used with the motors of hermetically sealed refrigerant compressors where the motor windings and the thermistors embedded therein are cooled by refrigerant gas. For causing thermistors to respond more quickly to motor current, I add additional heat to the thermistors by providing them with terminal end plates connected to closed loops so arranged within the motor windings that the loops act as secondary windings of a current transformer of which the motor windings are the primary winding. In the embodiment of FIGS. 1-3, the thermistor has end plates shaped to act as closed loops. In the embodiment of FIGS. 4-6, loops of relatively heavy wire are connected to end plates of a thermistor. The short-circuit currents in the closed loops add additional heat to a thermistor and aid in overcoming the lag between an increase in motor current and an increase in the heat of the motor windings caused directly by the increased motor current.

Referring now to FIGS. 1-3, an electric motor has a shell 10 around a stator 12 which has the usual stator coils 13a, 13b, 13c, 13d and 13e, each coil containing a number of wires 14 which are generally parallel. The motor has a rotor 15 on a shaft 11. Extending crosswise through the coils 13a, 13c and 13e are similar, series-connected thermistors 16 which have metal end plates 17 which extend between adjacent coils parallel to their wires 14. The end plates 17 have elongated portions which are shaped as by having metal punched therefrom, to form single turn loops 18. Currents are induced in the loops which heat the thermistors in addition to the heat added by the motor windings.

Referring now to FIGS. 4–6, series-connected thermistors 19 provided with circular end plates 20 of metal, are placed at the centers of coils 13a, 13b and 13c. Each end plate 20 has attached thereto, a single-turn loop 21 of relatively large wire, with the plane of the loop extending parallel to the wires of the coils. As in the case of FIGS. 1–4, short-circuit currents in the loops heat the thermistors.

Preferably, the end plates of the thermistors are permanent magnets in which additional heat is generated by hysteresis action.

In some cases, the heat added by the motor current to the thermistors through their end plates may be insufficient to overcome the lag in response to locked-rotor currents. For such cases, the overload protective circuit of FIG. 7 can be used.

In FIG. 7, an electric motor 30 having series-connected thermistors 31 of the type having positive temperature coefficients of resistance, in contact with its windings as shown by FIG. 1 or 4, is connected by wires 32 and 33 and switches S1 and S2 respectively, of magnetic starter MS, to electric supply lines L1 and L2 respectively. Such thermistors are semiconductors such as single crystal silicon, PbSe or $BaTiO_3$, the electrical resistances of which increase substantially at their critical temperatures. The thermistors 31 are connected in series with diode D1, secondary winding SW of step-down transformer T, and coil C1 of overload relay OR. The coil C1 is shunted by bypass capacitor 35. The primary winding PW of the transformer is connected to lines L1 and L2. Switch S3 of the relay OR is connected in series with coil C2 of the magnetic starter MS, safety switch 36 and thermostat 37 to the lines L1 and L2. The safety switch 36 may be a switch responsive to too high and too low refrigerant pressures from a refrigerant compressor which is not shown, and which would be driven by the motor 30.

The circuit described so far in connection with FIG. 7, except for the particular designs of the thermistors, is essentially that disclosed in said Kyle application. Normally, the motor temperature is insufficient to heat the thermistors 31 to their active temperatures so that their resistances remain low, the overload relay OR remains energized, and maintains the magnetic starter MS and the motor energized. When the windings of the motor overheat, the resistances of the thermistors increase so that the relay OR is deenergized and opens its switch S3 which deenergizes the magnetic starter which deenergizes the motor. Such operation has been found satisfactory except for locked rotor conditions when excessive motor current is drawn and which is not sensed directly by the prior thermistors.

When the thermistors are heated to a critical high temperature, their resistances increase, increasing the series resistance in the circuit of the overload relay coil C1, causing the overload relay OR to be deenergized. The same effect can be obtained by placing a voltage of the opposite polarity across the coil C1, and causing this voltage to be proportional to motor current. The overload relay can thus be caused to become deenergized by the effects of motor temperature and motor current so as to operate more quickly under locked rotor conditions. In FIG. 7, this is accomplished by placing a coil 40 around the wire 33 although it could be placed around the wire 32. The coil 40 acts as the secondary winding of a step-up transformer of which the wire 33 is the primary, and is connected in series with diode D2 and resistor 42 to coil C3 of voltage relay VR. A capacitor 44 is shunted across the coil C3. The relay VR has a normally open switch S4 which, when closed, connects the coil C3 across the coil C1. The direction of the turns of the coil 40 and the polarity of the diode D2 are such that when the coil C3 is connected across the coil C1, the voltage supplied by the coil C3 across the coil C1 is opposite in polarity to the voltage normally in the coil C1.

*Operation*

In the operation of FIG. 7, in normal operation, the thermostat 37 and the safety switch 36 would be closed, and the switch S3 of the overload relay OR would be closed so that the magnetic starter MS would be energized and would hold its switches S1 and S2 closed for energizing the motor 30. If an ordinary fault should occur which would cause the windings of the motor to overheat and to heat the thermistors 31 to their critical temperature, with the rotor of the motor continuing to rotate, the resistances of the thermistors would increase and cause the relay OR to be deenergized and to deenergize the magnetic starter MS and the motor 30.

If the rotor of the motor should lock without the motor windings having heated the thermistors to their critical temperatures, the excessive current drawn by the motor could damage it before the thermistors were heated to their critical temperatures if ordinary thermistors were used. With the thermistors 31 of FIG. 7, the increased motor current would cause additional heating of the end plates of the thermistors and would shorten the time required for the thermistors to be heated to their critical temperatures. The increased motor current through the wire 33 increases the voltage across the coil 40, which A.C. voltage is rectified by the diode D2, and charges through the resistor 42, the capacitor 44 across the coil C3 of the voltage relay VR, to a voltage sufficient to energize the relay VR which closes its switch S4 which connects the coil C3 across the coil C1. The resulting reverse voltage applied across the coil C1 by the coil C3 causes the overload relay OR to become deenergized more quickly than it would by the increased resistance in the circuit of the coil C1 caused by the heating of the thermistors.

The protective circuit of FIG. 7 thus responds both to overheating of the motor windings, and to excessive motor current.

What is claimed is:

1. A protective circuit for an electric motor comprising a thermistor having a positive temperature coefficient of resistance exposed to heat from said motor, means responsive to current drawn by said motor for additionally heating said thermistor, an overload relay having an energizing winding and a normally closed switch, means including said thermistor for flowing current in one direction through said winding, means responsive to current drawn by said motor for flowing current in the opposite direction through said winding, and an energizing circuit for said motor including said switch.

2. A protective circuit for an electric motor comprising a thermistor having a positive temperature coefficient of resistance exposed to heat from said motor, an overload relay having an energizing winding and a normally closed switch, an energizing circuit for said motor including said switch, means including said thermistor for flowing direct current in one direction through said winding, and means responsive to current drawn by said motor for flowing direct current in the opposite direction through said winding.

3. A protective circuit for an electric motor having stator windings, comprising a thermistor embedded in said windings, said thermistor having at its ends short-circuited loops in which current flowing through said windings induces currents which heat said loops and through said loops heat said thermistor, an overload relay having an energizing winding and a normally closed switch, an energizing circuit for said motor including said switch, means including said thermistor for flowing current in one direction through said relay winding, and means responsive to current drawn by said motor for flowing current in the opposite direction through said winding.

4. A protective circuit for an electric motor having stator windings, comprising a thermistor embedded in said windings, said thermistor having at its ends short-circuited loops in which current flowing through said windings induces currents which heat said loops and through said loops heat said thermistor, an overload relay having an energizing winding and a normally closed switch, an energizing circuit for said motor including said switch, and means including said thermistor for flowing current through said energizing winding.

5. A protective circuit for an electric motor, comprising an overload relay having an energizing winding and a normally closed switch, an energizing circuit for said motor including said switch, means including means responsive to the temperature of said motor for flowing direct current in one direction through said winding, and means responsive to current drawn by said motor for flowing direct current in the opposite direction through said winding.

References Cited in the file of this patent

UNITED STATES PATENTS

| | | |
|---|---|---|
| 1,729,561 | Vaughan | Sept. 24, 1929 |
| 2,377,506 | McWhirter | June 5, 1945 |
| 2,834,920 | Lennox | May 13, 1958 |
| 2,896,127 | Seeley | July 21, 1959 |
| 2,976,463 | Adams | Mar. 21, 1961 |